US012777395B2

(12) United States Patent
Mu

(10) Patent No.: US 12,777,395 B2
(45) Date of Patent: Oct. 27, 2026

(54) COMMUNICATION METHOD AND COMMUNICATION DEVICE

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 390 days.

(21) Appl. No.: 18/034,855

(22) PCT Filed: Nov. 2, 2020

(86) PCT No.: PCT/CN2020/125904
§ 371 (c)(1),
(2) Date: May 1, 2023

(87) PCT Pub. No.: WO2022/088181
PCT Pub. Date: May 5, 2022

(65) Prior Publication Data
US 2023/0422134 A1 Dec. 28, 2023

(51) Int. Cl.
*H04W 36/32* (2009.01)
*H04W 36/00* (2009.01)
*H04W 64/00* (2009.01)

(52) U.S. Cl.
CPC .................... *H04W 36/324* (2023.05); *H04W 36/008375* (2023.05); *H04W 36/0094* (2013.01); *H04W 64/006* (2013.01)

(58) Field of Classification Search
CPC ....... H04W 36/324; H04W 36/008375; H04W 36/0094; H04W 64/006; H04W 52/0254; H04W 52/0258; H04W 24/06; H04W 24/02; Y02D 30/70
See application file for complete search history.

(56) References Cited

U.S. PATENT DOCUMENTS

| | | | | |
|---|---|---|---|---|
| 11,109,283 | B1 * | 8/2021 | Kulkarni | H04W 24/02 |
| 12,081,998 | B2 * | 9/2024 | Kanza | H04W 24/02 |
| 2003/0224804 | A1 * | 12/2003 | Liu | H04W 60/00 455/456.2 |
| 2010/0118725 | A1 | 5/2010 | Chiou et al. | |
| 2014/0171106 | A1 * | 6/2014 | Cheng | H04W 64/006 455/456.1 |

(Continued)

FOREIGN PATENT DOCUMENTS

| | | | |
|---|---|---|---|
| CN | 105432118 | A | 3/2016 |
| WO | WO 2018125686 | A2 | 7/2018 |

OTHER PUBLICATIONS

PCT/CN2020/125904, English translation of Search Report dated Jul. 29, 2021, 2 pages.

(Continued)

*Primary Examiner* — Charles T Shedrick
(74) *Attorney, Agent, or Firm* — Cozen O'Connor

(57) ABSTRACT

A communication method is performed by a terminal and includes: determining at least one model for mobility management. The model for the mobility management includes one or more of a first model, a second model, and a third model. The mobility management includes one or a combination of: predicting an application scenario, configuring a measurement parameter, and determining a cell for communication/residence.

15 Claims, 4 Drawing Sheets

(56) References Cited

U.S. PATENT DOCUMENTS

2015/0036598 A1* 2/2015 Kilpatrick, II ........ H04W 36/10 370/329
2015/0036663 A1 2/2015 Kilpatrick et al.
2015/0038156 A1* 2/2015 Kilpatrick, II ........ H04W 36/10 455/561
2016/0048118 A1* 2/2016 Stearns .............. G05B 19/0423 700/295
2016/0219409 A1* 7/2016 Cai ..................... H04W 64/006
2018/0124631 A1* 5/2018 Ramos de Azevedo .................... H04W 28/0226
2020/0229206 A1* 7/2020 Badic ................ H04W 28/0226
2020/0259575 A1 8/2020 Bai et al.
2021/0168644 A1* 6/2021 Liu ...................... H04B 17/382
2021/0329522 A1* 10/2021 Li .......................... G06N 20/00
2022/0110007 A1* 4/2022 Kadadi ................. H04W 24/08
2022/0173849 A1* 6/2022 Rahman ................ H04W 24/02
2023/0074288 A1* 3/2023 Filippou ............... H04L 47/127
2023/0128527 A1* 4/2023 Teshome ................. H04L 67/30 709/224
2023/0370181 A1* 11/2023 Rydén .................. H04B 17/336

OTHER PUBLICATIONS

Chinese Patent Application No. 202080003253.8, Office Action dated Dec. 20, 2021; 6 pages.
Chinese Patent Application No. 202080003253.8, English translation of Office Action dated Dec. 20, 2021, 8 pages.
European Patent Application No. 20959341.7, Search and Opinion dated Nov. 30, 2023, 13 pages.
Indian Patent Application No. 202347037959, Office Action dated Nov. 7, 2023, 8 pages.
ZTE "AI based UE Trajectory Prediction" 3GPP TSG-RAN WG3 Meeting #110e, R3-206718, Nov. 2020, 4 pages.

* cited by examiner

COMMUNICATION METHOD AND COMMUNICATION DEVICE

CROSS-REFERENCE TO RELATED APPLICATION

This application is a national phase entry under 35 USC § 371 of International Application PCT/CN2020/125904, filed Nov. 2, 2020, the entire content of which is incorporated herein by reference.

BACKGROUND

In a communication system, in order to track channel information, a terminal needs to track a channel at different frequency points, different antenna ports, and different times. For example, switching a communication cell or performing a cell reselection requires multiple measurements at multiple frequency points, multiple times, and multiple ports.

However, for some terminals moving on a same track every day, a cell selected during the moving process is also relatively fixed. For such a terminal with a regular movement trajectory, if multiple frequent measurements are still performed, power of the terminal will be consumed.

SUMMARY

The present disclosure generally relates to a technical field of wireless communication, and more particularly to a communication method and a communication device.

According to a first aspect of embodiments of the present disclosure, a communication method is provided, performed by a terminal and including:

- determining at least one model for mobility management, in which the model for the mobility management includes one or more of a first model, a second model, and a third model; and the mobility management includes one or a combination of:
- predicting an application scenario, configuring a measurement parameter, and determining a cell for communication/residence.

According to a second aspect of embodiments of the present disclosure, a communication method is provided, performed by a network and including:

- determining at least one model for mobility management, in which the model for the mobility management includes one or more of a first model, a second model, and a third model; and the mobility management includes one or a combination of: predicting an application scenario, configuring a measurement parameter, and determining a cell for communication/residence.

According to a third aspect of embodiments of the present disclosure, a communication device is provided, including:

- a processor; and a memory configured to store a processor-executable instruction.

The processor is configured to: execute the communication method according to the first aspect or any one embodiment of the first aspect; or configured to: execute the communication method according to the second aspect or any one embodiment of the second aspect.

It is to be understood that both the foregoing general description and the following detailed description are illustrative and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
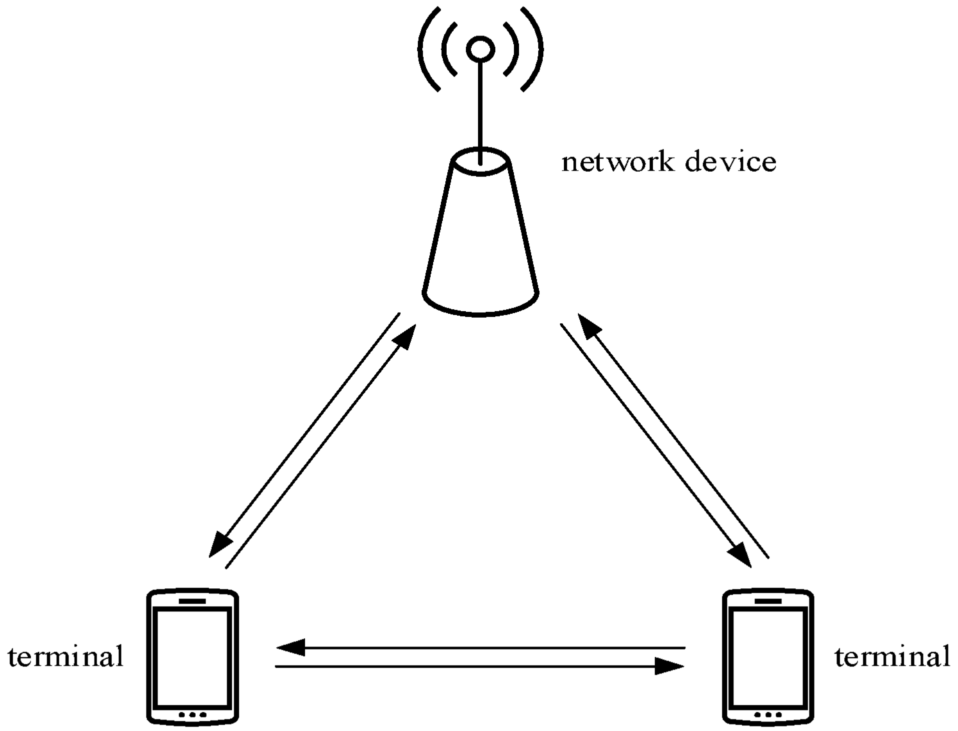
FIG. 1 is an architectural diagram showing a communication system between a network device and a user equipment according to an illustrative embodiment.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to the disclosure as recited in the appended claims.

In a communication system, in order to track channel information, a terminal needs to track a channel at different frequency points, different antenna ports, and different times. However, for some terminals with a regular moving trajectory, for example, they go from home to work every morning and from work to home every evening, and the moving trajectories are also the same, so a cell they select during the moving process is also relatively fixed. Therefore, for these terminals with fixed mobility rules, when doing a mobility management, it is not necessary to perform multiple measurements at multiple frequencies, multiple times, and multiple ports during a process of cell handover or cell reselection, resulting in a power consumption of the terminal.

On the other hand, with a development of artificial intelligence, especially a rapid development of a machine learning technology, the machine learning technology of the artificial intelligence is good at discovering inherent characteristics and relations between data, generating corresponding models, and making corresponding predictions and adjustments based on the models. The characteristics of self-learning, self-optimization and self-decision-making are also favored by more and more industries.

In order to save the power consumption of the terminal, in the field of the energy saving of the terminal, the artificial intelligence technology can be used to mine potential characteristics and internal relations of various service data and user data. The artificial intelligence technology is good at discovering the inherent characteristics and relations in data, generating the corresponding models, and can use the generated models to make the corresponding predictions and adjustments. Therefore, in the disclosure, the corresponding various service data and user data characteristics and various function saving parameters are used to drive the machine learning technology during the handover/cell reselection, and form an optimal parameter configuration model for each user for various service data, providing more refined and personalized power saving solutions. Moreover, the communication method provided by the present disclosure can also predict corresponding various service data, user data, network statuses, etc. during the handover/cell reselection. By predicting an application scenario of the terminal and pre-configuring a channel measurement parameter for the predicted application scenario, and then pre-determining the execution of the terminal handover/cell reselection, the cell for communication with the terminal is determined to achieve the effect of effectively saving the power consumption.

FIG. 1 is an architectural diagram showing a communication system between a network device and a user equipment according to an illustrative embodiment. A communication method provided by the present disclosure may be performed by the architectural diagram of the communication system shown in FIG. 1. As shown in FIG. 1, a base station can configure at least one model for a terminal, and send a message indicating the model used by the terminal. The terminal determines the configured model according to an instruction sent by the base station, or determines a prediction model to be used.

It may be understood that the communication system between the network device and the terminal shown in FIG. 1 is only for schematic illustration. The wireless communication system may also include other network devices, such as core network devices, wireless relay devices, and wireless backhaul devices, which are not shown in FIG. 1. The number of network devices and the number of terminals included in the wireless communication system are not limited in embodiments of the present disclosure.

It may be further understood that the wireless communication system in the embodiment of the present disclosure is a network that provides a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (SC-FDMA), and carrier sense multiple access with collision avoidance. The network may be divided into a 2nd generation (2G) network, a 3G network, a 4G network, or a future evolution network, such as a 5G network, which may also be referred to as a new radio (NR) network, according to the capacity, rate, delay and other factors of different networks. For ease of description, a wireless communication network will be sometimes abbreviated as a network in the present disclosure.

Further, the network device involved in the present disclosure may also be referred to as a radio access network device. The radio access network device may be a base station, an evolved node B, a home base station, an access point (AP) in a wireless fidelity (WIFI) system, a wireless relay node, a wireless backhaul node, a transmission point (TP), a transmission and reception point (TRP), or the like, or may also be a gNB in a NR system, or may also be a component or a part of a device that constitutes a base station, etc. The network device may also be a vehicle-mounted device when it is used in a vehicle to everything (V2X) communication system. It is to be understood that the specific technology and specific device form adopted by the network device are not limited in the embodiments of the present disclosure.

Further, the terminal involved in the present disclosure, which may also be referred to as a terminal device, a user equipment (UE), a mobile station (MS), a mobile terminal (MT), etc., is a device that provides voice and/or data connectivity to a user. For example, the terminal may be a handheld device with a wireless connection function, a vehicle-mounted device, or the like. At present, some examples of the terminal are a smart phone, a pocket personal computer (PPC), a palmtop computer, a personal digital assistant (PDA), a notebook computer, a tablet computer, a wearable device, a vehicle-mounted device, or the like. In addition, the terminal device may also be a vehicle-mounted device when it is used in a vehicle to everything (V2X) communication system. It is to be understood that the specific technology and specific device form adopted by the terminal are not limited in the embodiments of the present disclosure.

In some embodiments of the present disclosure, a communication method is provided.

Figure 2:
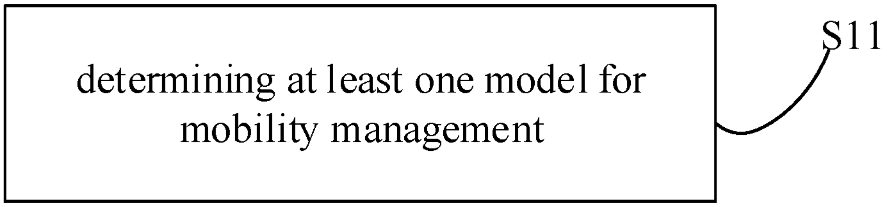
FIG. 2 is a flowchart showing a communication method according to an illustrative embodiment.

FIG. 2 is a flowchart showing a communication method according to an illustrative embodiment. As shown in FIG. 2, the communication method is performed by a terminal and includes steps as follows.

In step S11, at least one model for mobility management is determined.

In embodiments of the present disclosure, the model includes at least one of the following models: a first model, a second model, and a third model; and the model includes at least one model for the mobility management. The mobility management includes one or a combination of:

predicting an application scenario, configuring a measurement parameter, and determining a cell for communication/residence.

In embodiments of the present disclosure, the first model, the second model, and the third model are pre-built based on historical parameters. In the disclosure, the pre-built models are referred to as the first model, the second model, and the third model for convenience of distinction. The first model may include one or more models, the second model may include one or more models, and the third model may include one or more models. By using the first model, the second model and/or the third model to predict related parameters of the terminal, the related parameters include at least one of:

predicting an application scenario, configuring a measurement parameter (such as a channel measurement period, and a measurement port), and determining a cell for communication/residence of the terminal. In embodiments of the present disclosure, determining the cell for the communication/residence of the terminal may include any one of:

switching a cell for communication/residence, maintaining a cell for current communication/residence, and performing a cell reselection.

In all embodiments of the present disclosure, the first model, the second model, and the third model may be determined by any side of a point, an edge, or an end. The point refers to the terminal, the edge refers to an edge computing device, and the end refers to a central office device. That is, any of the above models can be calculated by the terminal device, or by the edge computing device, or by the central office device. In some embodiments, after any one of the above models is calculated, the model can be synchronized to any other device in a system, and details will not be repeated here. In the embodiments of the present disclosure, the edge refers to the edge computing device, or any possible device located between the central office device and the terminal device after computing power is sliced. In embodiments of the present disclosure, an architecture or connection relationship of the "edge" device in the network is not limited. In some embodiments, the "edge" device may be a base station device, or a data center connected to the base station. In some embodiments, the central office device may be a core network device, or may be a data center connected to the core network device.

In an illustrative embodiment of the present disclosure, for convenience of description, at least one model configured to predict the application scenario of the terminal is referred to as the first model. The first model is obtained by training according to a historical first parameter set and a corresponding application scenario. In some embodiments, the historical first parameter set and the corresponding application scenario are obtained by analyzing data from the terminal through a clustering algorithm. The first parameter set includes at least one of following parameters:

location information, application usage information, cell selection information, and channel measurement information.

The first parameter set is an input of the first model, and the application scenario is an output of the first model. In embodiments of the present disclosure, the application scenario may be a commuting scenario, a static scenario, etc. The commuting scenario may also include a first commuting scenario, a second commuting scenario, and other application scenarios. For example, the first commuting scenario may be a commuting scenario to work, and the second commuting scenario may be a commuting scenario after work.

The terminal determines a current first parameter set, including one or more of location information, application usage information, cell selection information, and channel measurement information. The first parameter set is input into the first model to determine the current application scenario, and the determined current application scenario is sent to a network side. This embodiment can be implemented, and can also be applied together with other embodiments.

In an illustrative embodiment of the present disclosure, the second model is configured to configure the measurement parameter, and the configured measurement parameter includes a channel measurement period and/or a measurement port of a channel. The terminal is guided to perform the channel measurement based on the measurement parameter, and then a plurality of channel measurement values are determined according to the channel measurement period and/or the measurement port for measuring the channel which are/is configured according to the second model. The second model is obtained by training based on a historical second parameter set and a corresponding measurement parameter.

In embodiments of the present disclosure, the historical second parameter set configured for training the second model and the corresponding measurement parameter are obtained by analyzing data from the terminal through a clustering algorithm. The second parameter set includes at least one of following parameters:

channel measurement information, time information, location information, and a cell ID.

The measurement parameter includes a channel measurement period and/or a measurement port.

The second parameter set is an input of the second model, and the measurement parameter is an output of the second model. In some embodiments of the present disclosure, the second parameter set may have a one-to-one correspondence with the application scenario, that is, each application scenario corresponds to a second parameter set. For example, the first model predicts that the terminal is in a static scenario, and then the second parameter set corresponding to the static scenario is determined. The second parameter set may be input into the second model to determine the measurement period and/or the measurement port configured for the static scenario. The input of the second model can be determined according to the application scenario determined by the first model, or can be determined according to other information. This embodiment can be implemented, and can also be applied together with other embodiments.

In an illustrative embodiment of the present disclosure, the third model is configured to determine the cell for the communication/residence of the terminal. The terminal receives a first indication message sent by the network side, where the first indication message is configured to instruct the terminal to determine the cell for the communication/residence.

In embodiments of the present disclosure, the network side determines the first indication message through the determined third model, and the first indication message instructs the terminal to determine the cell for the communication/residence, and to perform operations of hold/handover/cell reselection. As mentioned above, the hold can be understood as the network side instructing the terminal to continue to use the current cell for the communication/residence. The handover can be understood as the network side instructing the terminal to switch to another designated cell different from the current cell for the communication, and the designated cell is configured for the communication of the terminal. The cell reselection can be understood as the network side instructing the terminal to perform an operation of the cell reselection, and re-determines the cell for the communication/residence of the terminal. The terminal determines the hold/handover/cell reselection according to the indication message sent by the network side, thus determining the cell for the communication/residence.

In embodiments of the present disclosure, the third model is obtained by training according to a historical third parameter set and a corresponding first indication message. The historical third parameter set and the corresponding first indication message are obtained by analyzing data from the terminal through a clustering algorithm. It can be understood that there is a one-to-one mapping relationship between the third parameter set and the corresponding first indication message. The third parameter set includes at least one of following parameters:

time, a channel measurement value, location information, and a cell ID

The historical parameter set is an input of the third model, and the corresponding first indication message is an output of the third model.

In embodiments of the present disclosure, after the third model is determined, the current third parameter set of the terminal is input, including one or more of the time, the channel measurement value, the location information, and the cell ID, and then the first indication message corresponding to the third parameter set can be determined. For example, if the third model determines that the variation trend of the channel measurement value included in the input third parameter set is gradually weakening, it is determined that the terminal is at an edge of the current communication cell at this time. The third model further determines an indication message to switch the cell for the communication/residence, and the indication message is sent by the network side to the terminal, instructing the terminal to switch the cell for the communication/residence.

In embodiments of the present disclosure, the channel measurement value configured for the input of the third model may be determined based on the measurement parameter configured according to the second model to instruct the terminal to perform the channel measurement, or may be determined based on the measurement parameter configured according to predefined information. The measurement parameter includes a channel measurement period, a measurement port, etc. A plurality of channel measurement values are determined according to parameters such as the channel measurement period and the measurement port configured based on the second model.

In the above-mentioned embodiments of the present disclosure, three models are used for illustration, that is: firstly, the application scenario is determined with the first model, the measurement parameter is determined with the second model, and the first indication message is determined with the third model. Those skilled in the art can be understood that these descriptions are only illustrative. Those skilled in the art can use an appropriate number of models to determine the first indication parameter, and the number of models are not limited in the embodiments of the present disclosure.

In an illustrative embodiment of the present disclosure, one model or multiple models may be trained. If one model is trained, the terminal can configure and use the model. If multiple models are trained, the terminal needs to configure the multiple models, and determine the first model to be used among the multiple models. The multiple models are trained based on historical parameter sets and corresponding information. In embodiments of the present disclosure, the terminal determines at least one model based on the multiple models, which may be performed based on the indication message sent by the network side. The indication message includes an indicator configured to indicate at least one model. The terminal determines at least one model corresponding to the indicator according to the indicator included in the indication message and configured to indicate the at least one model, and determines the first indication message based on at least one model. It can be understood that the indicator configured to indicate the at least one model may be an explicit indicator, such as a bit, a symbol, etc., and it may also be an implicit indicator, such as implicitly determining at least one model to be used with a certain signaling.

In embodiments of the present disclosure, one or more models to be trained can be trained on the terminal, on the network side device, or on the edge computing device. Of course, the training can also be simultaneously performed on any two or three of the above three devices. If the training of models is performed on the network side device, the network side sends a second indication message to configure one or more models. The terminal or any other appropriate devices may configure one or more models in response to receiving the second indication message sent by the network side. One manner of configuring the models is that the second indication message includes acquisition locations of one or more models, and the terminal configures one or more models according to the acquisition locations of the models included in the second indication message. Another way to configure the models is to configure one or more models based on the predefined information. The training of multiple models may be training corresponding different models at different times according to usage habits for the terminal. For example, a corresponding model is trained for the morning peak, a corresponding model is trained for the midday time, and a corresponding model is trained for the evening peak.

In embodiments of the present disclosure, the network side device (such as a base station) updates the configured one or more models according to generated new data, and/or retrains at least one model, and tests the updated one or more models and/or new models. If the updated one or more models and/or the new models pass the test and can run stably, a third indication message is sent, and the third indication message is configured to instruct the terminal to reconfigure one or more models. The terminal determines to reconfigure one or more models according to the received third indication message.

Based on the same/similar concept, embodiments of the present disclosure also provide a communication method.

Figure 3:
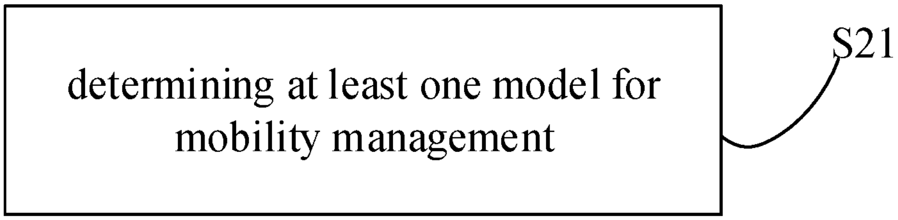
FIG. 3 is a flowchart showing another communication method according to an illustrative embodiment.

FIG. 3 is a flowchart showing a communication method according to an illustrative embodiment. As shown in FIG. 3, the communication method is performed by a network side and includes steps as follows.

In step S21, at least one model for mobility management is determined.

In embodiments of the present disclosure, the model includes at least one of the following models: a first model, a second model, and a third model; and the model includes at least one model for the mobility management. The mobility management includes one or a combination of:

predicting an application scenario, configuring a measurement parameter, and determining a cell for communication/residence.

In embodiments of the present disclosure, the first model, the second model, and the third model are pre-built based on historical parameters. In the disclosure, the pre-built models are referred to as the first model, the second model, and the third model for convenience of distinction. The first model may include one or more models, the second model may include one or more models, and the third model may include one or more models. By using the first model, the second model and/or the third model to predict related parameters of the terminal, the related parameters include at least one of:

predicting an application scenario, configuring a measurement parameter (such as a channel measurement period, and a measurement port), and determining a cell for communication/residence of the terminal. In embodiments of the present disclosure, determining the cell for the communication/residence of the terminal may include any one of:

switching a cell for communication/residence, maintaining a cell for current communication/residence, and performing a cell reselection.

In all embodiments of the present disclosure, the first model, the second model, and the third model may be determined by any side of a point, an edge, or an end. The point refers to the terminal, the edge refers to an edge computing device, and the end refers to a central office device. That is, any of the above models can be calculated by the terminal device, or by the edge computing device, or by the central office device. In some embodiments, after any one of the above models is calculated, the model can be synchronized to any other device in a system, and details will not be repeated here. In the embodiments of the present disclosure, the edge refers to the edge computing device, or any possible device located between the central office device and the terminal device after computing power is sliced. In embodiments of the present disclosure, an architecture or connection relationship of the "edge" device in the network is not limited. In some embodiments, the "edge" device may be a base station device, or a data center connected to the base station. In some embodiments, the central office device may be a core network device, or may be a data center connected to the core network device.

In an illustrative embodiment of the present disclosure, for convenience of description, at least one model configured to predict the application scenario of the terminal is referred to as the first model. The first model is obtained by training according to a historical first parameter set and a corresponding application scenario. In some embodiments, the historical first parameter set and the corresponding application scenario are obtained by analyzing data from the terminal through a clustering algorithm. The first parameter set includes at least one of following parameters:

location information, application usage information, cell selection information, and channel measurement information.

The first parameter set is an input of the first model, and the application scenario is an output of the first model. In embodiments of the present disclosure, the application scenario may be a commuting scenario, a static scenario, etc. The commuting scenario may also include a first commuting scenario, a second commuting scenario, and other application scenarios. For example, the first commuting scenario may be a commuting scenario to work, and the second commuting scenario may be a commuting scenario after work.

The terminal determines a current first parameter set, including one or more of location information, application usage information, cell selection information, and channel measurement information. The first parameter set is input into the first model to determine the current application scenario, and the determined current application scenario is sent to a network side. This embodiment can be implemented, and can also be applied together with other embodiments.

In an illustrative embodiment of the present disclosure, the second model is configured to configure the measurement parameter, and the configured measurement parameter includes a channel measurement period and/or a measurement port of a channel. A plurality of channel measurement values are determined according to the channel measurement period and/or the measurement port for measuring the channel which are/is configured according to the second model. The second model is obtained by training based on a historical second parameter set and a corresponding measurement parameter.

In embodiments of the present disclosure, the historical second parameter set configured for training the second model and the corresponding measurement parameter are obtained by analyzing data from the terminal through a clustering algorithm. The second parameter set includes at least one of following parameters:

channel measurement information, time information, location information, and a cell ID.

The measurement parameter includes a channel measurement period and/or a measurement port.

The second parameter set is an input of the second model, and the measurement parameter is an output of the second model. In some embodiments of the present disclosure, the second parameter set may have a one-to-one correspondence with the application scenario, that is, each application scenario corresponds to a second parameter set. For example, the first model predicts that the terminal is in a static scenario, and then the second parameter set corresponding to the static scenario is determined. The second parameter set may be input into the second model to determine the measurement period and/or the measurement port configured for the static scenario. The input of the second model can be determined according to the application scenario determined by the first model, or can be determined according to other information. This embodiment can be implemented, and can also be applied together with other embodiments.

After determining the current application scenario, a current second parameter set is determined based on the application scenario, and the second parameter set is input to the second model to determine the measurement parameter, including the measurement period and/or the measurement port. The terminal is guided to perform channel measurement based on the measurement parameter, and then a plurality of channel measurement values are determined.

In an illustrative embodiment of the present disclosure, the third model is configured to determine the cell for the communication/residence of the terminal. The terminal receives a first indication message sent by the network side, where the first indication message is configured to instruct the terminal to determine the cell for the communication/residence.

In embodiments of the present disclosure, the network side determines the first indication message through the determined third model, and the first indication message instructs the terminal to determine the cell for the communication/residence, and to perform operations of hold/handover/cell reselection. As mentioned above, the hold can be understood as the network side instructing the terminal to continue to use the current cell for the communication/residence. The handover can be understood as the network side instructing the terminal to switch to another designated cell different from the current cell for the communication, and the designated cell is configured for the communication of the terminal. The cell reselection can be understood as the network side instructing the terminal to perform an operation of the cell reselection, and re-determines the cell for the communication/residence of the terminal. The terminal determines the hold/handover/cell reselection according to the indication message sent by the network side, thus determining the cell for the communication/residence.

In embodiments of the present disclosure, the third model is obtained by training according to a historical third parameter set and a corresponding first indication message. The historical third parameter set and the corresponding first indication message are obtained by analyzing data from the terminal through a clustering algorithm. It can be understood that there is a one-to-one mapping relationship between the third parameter set and the corresponding first indication message. The third parameter set includes at least one of following parameters:

time, a channel measurement value, location information, and a cell ID

The historical parameter set is an input of the third model, and the corresponding first indication message is an output of the third model.

In embodiments of the present disclosure, after the third model is determined, the current third parameter set of the terminal is input, including one or more of the time, the channel measurement value, the location information, and the cell ID, and then the first indication message corresponding to the third parameter set can be determined. For example, if the third model determines that the variation trend of the channel measurement value included in the input third parameter set is gradually weakening, it is determined that the terminal is at an edge of the current communication cell at this time. The third model further determines an indication message to switch the cell for the communication/residence, and the indication message is sent by the network side to the terminal, instructing the terminal to switch the cell for the communication/residence.

In embodiments of the present disclosure, the channel measurement value configured for the input of the third model may be determined based on the measurement parameter configured according to the second model to instruct the terminal to perform the channel measurement, or may be determined based on the measurement parameter configured according to predefined information. The measurement parameter includes a channel measurement period, a measurement port, etc. A plurality of channel measurement values are determined according to parameters such as the channel measurement period and the measurement port configured based on the second model.

The network determines the plurality of channel measurement values determined by the current terminal, inputs the plurality of channel measurement values to the third model, and determines the current cell for the communication/residence of the terminal according to the third model.

In the above-mentioned embodiments of the present disclosure, three models are used for illustration, that is: firstly, the application scenario is determined with the first model, the measurement parameter is determined with the second model, and the first indication message is determined with the third model. Those skilled in the art can be understood that these descriptions are only illustrative. Those skilled in the art can use an appropriate number of models to determine the first indication parameter, and the number of models are not limited in the embodiments of the present disclosure.

In an illustrative embodiment of the present disclosure, one model or multiple models may be trained. If one model is trained, the terminal can configure and use the model. If multiple models are trained, the terminal needs to configure the multiple models, and determine the first model to be used among the multiple models. The multiple models are trained based on historical parameter sets and corresponding information. In embodiments of the present disclosure, the terminal determines at least one model based on the multiple models, which may be performed based on the indication message sent by the network side. The indication message includes an indicator configured to indicate at least one model. The terminal determines at least one model corresponding to the indicator according to the indicator included in the indication message and configured to indicate the at least one model, and determines the first indication message based on at least one model. It can be understood that the indicator configured to indicate the at least one model may be an explicit indicator, such as a bit, a symbol, etc., and it may also be an implicit indicator, such as implicitly determining at least one model to be used with a certain signaling.

In embodiments of the present disclosure, one or more models to be trained can be trained on the terminal, on the network side device, or on the edge computing device. Of course, the training can also be simultaneously performed on any two or three of the above three devices. If the training of models is performed on the network side device, the network side sends a second indication message to configure one or more models. The terminal or any other appropriate devices may configure one or more models in response to receiving the third indication message sent by the network side. One manner of configuring the models is that the second indication message includes acquisition locations of one or more models, and the terminal configures one or more models according to the acquisition locations of the models included in the second indication message. Another way to configure the models is to configure one or more models based on the predefined information. The training of multiple models may be training corresponding different models at different times according to usage habits for the terminal. For example, a corresponding model is trained for the morning peak, a corresponding model is trained for the midday time, and a corresponding model is trained for the evening peak.

In embodiments of the present disclosure, the network side device (such as a base station) updates the configured one or more models according to generated new data, and/or retrains at least one model, and tests the updated one or more models and/or new models. If the updated one or more models and/or the new models pass the test and can run stably, a third indication message is sent, and the third indication message is configured to instruct the terminal to reconfigure one or more models. The terminal determines to reconfigure one or more models according to the received third indication message.

Based on the same concept, embodiments of the present disclosure also provide a communication device.

It may be understood that, the communication device provided by the embodiments of the present disclosure includes corresponding hardware structures and/or software modules for performing various functions in order to implement the above-mentioned functions. The embodiments of the present disclosure may be implemented in a form of hardware or a combination of hardware and computer software in combination with units and algorithm steps of each example disclosed in the embodiments of the present disclosure. Whether a function is performed by hardware or by hardware driven by computer software depends on specific applications and design constraints of the technical solution. Those skilled in the art may use different methods to implement the described functions for each specific application, but such an implementation should not be regarded as extending beyond the scope of the technical solutions of the embodiments of the present disclosure.

Figure 4:
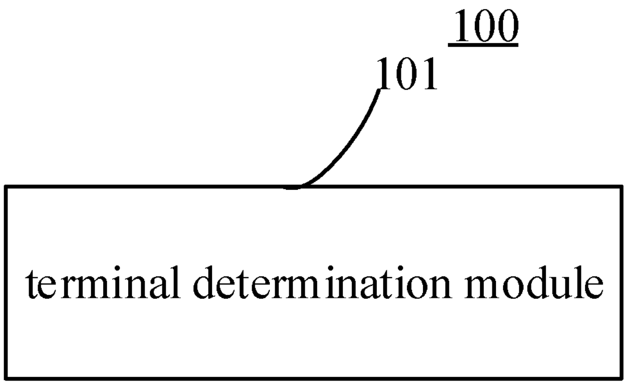
FIG. 4 is a block diagram of a communication device according to an illustrative embodiment.

FIG. 4 is a block diagram of a communication device 100 according to an illustrative embodiment. Referring to FIG. 4, the device includes a terminal determination module 101.

The terminal determination module 101 is configured to determine at least one model for mobility management, in which the model for the mobility management includes one or more of a first model, a second model, and a third model. The mobility management includes one or a combination of:

predicting an application scenario, configuring a measurement parameter, and determining a cell for communication/residence.

In embodiments of the disclosure, the first model is configured to predict the application scenario.

In embodiments of the disclosure, the first model is obtained by training according to a historical first parameter set and a corresponding application scenario. The first parameter set includes at least one of following parameters: location information, application usage information, cell selection information, and channel measurement information. The first parameter set is an input of the first model, and the application scenario is an output of the first model.

In embodiments of the disclosure, the terminal determination module 101 is configured to determine a current first parameter set. A current application scenario is determined according to the first parameter set and the first model.

In embodiments of the disclosure, the second model is configured to configure the measurement parameter, and the measurement parameter is configured for the terminal to perform channel measurement.

In embodiments of the disclosure, the second model is obtained by training according to a historical second parameter set and a corresponding measurement parameter. The second parameter set includes at least one of following parameters: channel measurement information, time information, location information, a cell identity (ID), and scenario information. The measurement parameter includes a channel measurement period and/or a measurement port. The second parameter set is an input of the second model, and the measurement parameter is an output of the second model.

In embodiments of the disclosure, the third model is configured to determine the cell for the communication/residence of the terminal.

In embodiments of the disclosure, the cell for the communication/residence of the terminal is determined based on a first indication message.

In embodiments of the disclosure, the third model is obtained by training according to a historical third parameter set and a corresponding first indication message. The third parameter set includes at least one of following parameters: time, a channel measurement value, location information, a cell ID, and scenario information. The historical parameter set is an input of the third model, and the corresponding first indication message is an output of the third model.

In embodiments of the disclosure, the model for the mobility management is determined among a plurality of the first models, the second models and the third models.

In embodiments of the disclosure, the communication device further includes:

- receiving a second indication message, in which the second indication message is configured to instruct the terminal to configure multiple models.

In embodiments of the disclosure, the communication configuring the multiple models includes:

- configuring the multiple models based on acquisition locations of the multiple models included in the second indication message; or, configuring the multiple models based on predefined information.

In embodiments of the disclosure, the communication device further includes:

- receiving a third indication message, in which the third indication message is configured to instruct the terminal to reconfigure one or more models; and determining to reconfigure one or more models according to the third indication message.

Figure 5:
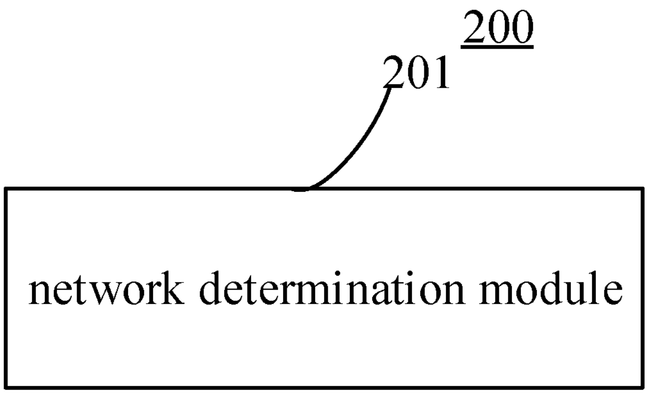
FIG. 5 is a block diagram of another communication device according to an illustrative embodiment.

FIG. 5 is a block diagram of a communication device 200 according to an illustrative embodiment. Referring to FIG. 5, the device is configured to a network side and includes a network determination module 201.

The network determination module 201 is configured to determine at least one model for mobility management, in which the model for the mobility management includes one or more of a first model, a second model, and a third model. The mobility management includes one or a combination of:

- predicting an application scenario, configuring a measurement parameter, and determining a cell for communication/residence.

In embodiments of the disclosure, the first model is configured to predict the application scenario.

In embodiments of the disclosure, the first model is obtained by training according to a historical first parameter set and a corresponding application scenario.

The first parameter set includes at least one of following parameters: location information, application usage information, cell selection information, and channel measurement information.

The first parameter set is an input of the first model, and the application scenario is an output of the first model.

In embodiments of the disclosure, the network determination module 201 is configured to determine a current first parameter set. A current application scenario is determined according to the first parameter set and the first model.

In embodiments of the disclosure, the second model is configured to configure the measurement parameter, and the measurement parameter is configured for the terminal to perform channel measurement.

In embodiments of the disclosure, the second model is obtained by training according to a historical second parameter set and a corresponding measurement parameter. The second parameter set includes at least one of following parameters: channel measurement information, time information, location information, a cell identity (ID), and scenario information. The measurement parameter includes a channel measurement period and/or a measurement port. The second parameter set is an input of the second model, and the measurement parameter is an output of the second model.

In embodiments of the disclosure, the network determination module 201 is configured to, determine a current second parameter set. The measurement parameter is determined according to the second parameter set and the second model.

In embodiments of the disclosure, the third model is configured to determine the cell for the communication/residence of the terminal.

In embodiments of the disclosure, the cell for the communication/residence of the terminal is determined based on a first indication message.

In embodiments of the disclosure, the third model is obtained by training according to a historical third parameter set and a corresponding first indication message. The third parameter set includes at least one of following parameters: time, a channel measurement value, location information, a cell ID, and scenario information. The historical parameter set is an input of the third model, and the corresponding first indication message is an output of the third model.

In embodiments of the disclosure, the network determination module is configured to:

- determine a current third parameter set. The cell for the communication/residence of the terminal is determined according to the third parameter set and the third model.

In embodiments of the disclosure, the model for the mobility management is determined among a plurality of the first models, the second models and the third models.

In embodiments of the disclosure, the communication device further includes:

- sending a second indication message, in which the second indication message is configured to instruct the terminal to configure multiple models.

In embodiments of the disclosure, configuring the multiple models includes:

- configuring the multiple models based on acquisition locations of the multiple models included in the second indication message; or, configuring the multiple models based on predefined information.

In embodiments of the disclosure, the communication device further includes:

- receiving a third indication message, in which the third indication message is configured to instruct the terminal to reconfigure one or more models; and determining to reconfigure one or more models according to the third indication message.

With respect to the devices in the above embodiments, the specific manners for performing operations for individual modules therein have been described in detail in the embodiments regarding the methods, which will not be elaborated herein.

Figure 6:
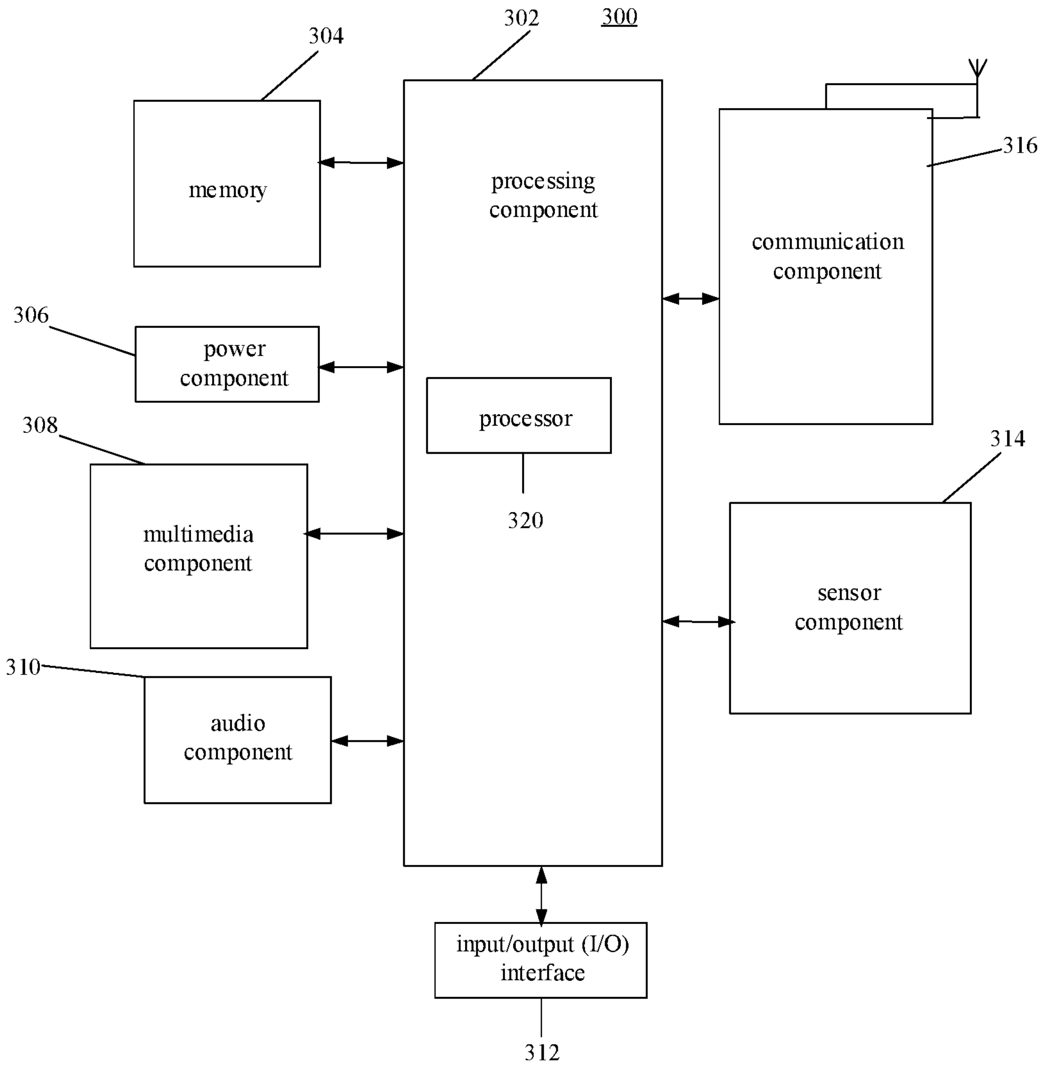
FIG. 6 is a block diagram of a communication device according to an illustrative embodiment.

FIG. 6 is a block diagram of a device 300 for channel detection according to an illustrative embodiment. For example, the device 300 can be a mobile phone, a computer, a digital broadcast terminal, a messaging device, a game console, a tablet device, a medical device, a fitness device, a personal digital assistant, or the like.

Referring to FIG. 6, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, phone calls, data communications, camera operations, and recording operations. The processing component 302 can include one or more processors 320 to execute instructions to perform all or some of the steps in the above-described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, videos, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and/or the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as keyboards, click wheels, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300. The sensor component 314 may also detect a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may further include a light sensor, such as a CMOS or CCD image sensor, for use in imaging applications. In some embodiments, the sensor component 314 may further include an accelerometer sensor, a gyroscope sensor, a magnetic sensor, a pressure sensor, or a temperature sensor.

The communication component 316 is configured to facilitate communication, wired or wireless, between the device 300 and other devices. The device 300 can access a wireless network based on a communication standard, such as WiFi, 2G, or 3G, or a combination thereof. In an illustrative embodiment, the communication component 316 receives a broadcast signal or broadcast associated information from an external broadcast management system via a broadcast channel. In an illustrative embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an illustrative embodiment, there is also provided a non-transitory computer readable storage medium including instructions, such as included in the memory 304, executable by the processor 320 in the device 300, for completing the above-mentioned method. For example, the non-transitory computer-readable storage medium may be a ROM, a random access memory (RAM), a CD-ROM, a magnetic tape, a floppy disc, an optical data storage device, and the like.

Figure 7:
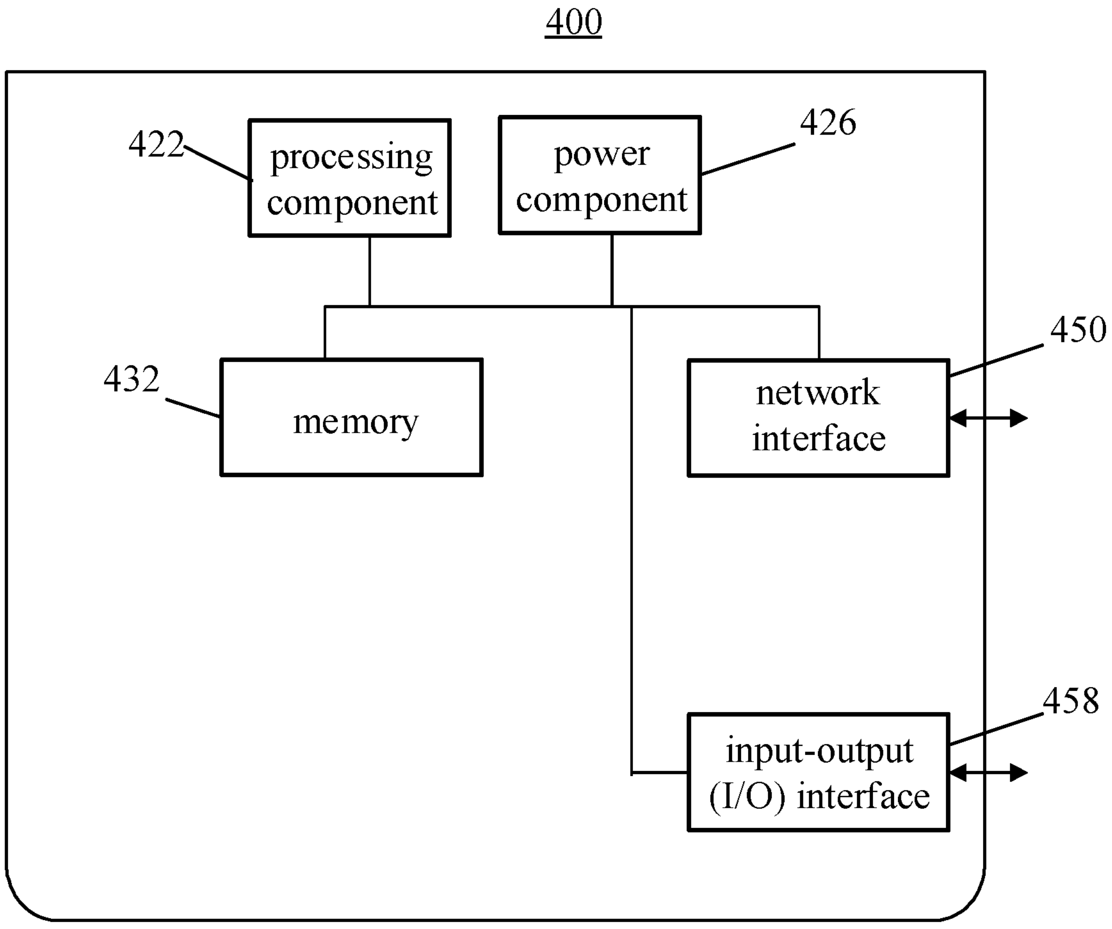
FIG. 7 is a block diagram of another communication device according to an illustrative embodiment.

FIG. 7 is a block diagram of a device 400 for channel detection according to an illustrative embodiment. For example, the device 400 may be provided as a server. Referring to FIG. 7, the device 400 includes a processing component 422, which further includes one or more processors, and a memory resource represented by a memory 432 configured to store instructions executable by the processing component 422, such as application programs. The application programs stored in the memory 432 may include one or more modules each corresponding to a set of instructions. In addition, the processing component 422 is configured to execute instructions to perform the above-mentioned channel detection method.

The device 400 may also include a power component 426 configured to perform the power management of the device 400, a wired or wireless network interfaces 450 configured to connect the device 400 to a network, and an input-output (I/O) interface 458. The device 400 may operate based on an operating system stored in the memory 432, such as Windows Server™, Mac OS X™, Unix™, Linux™, FreeBSD™, or the like.

According to a first aspect of embodiments of the present disclosure, a communication method is provided, performed by a terminal and including:

determining at least one model for mobility management, in which the model for the mobility management includes one or more of a first model, a second model, and a third model; and the mobility management includes one or a combination of:

predicting an application scenario, configuring a measurement parameter, and determining a cell for communication/residence.

In one embodiment, the first model is configured to predict the application scenario.

In one embodiment, the first model is obtained by training according to a historical first parameter set and a corresponding application scenario. The first parameter set includes at least one of following parameters: location information, application usage information, cell selection information, and channel measurement information. The first parameter set is an input of the first model, and the application scenario is an output of the first model.

In one embodiment, predicting the application scenario includes:

determining a current first parameter set; and determining a current application scenario according to the first parameter set and the first model.

In one embodiment, the second model is configured to configure the measurement parameter, and the measurement parameter is configured for the terminal to perform channel measurement.

In one embodiment, the second model is obtained by training according to a historical second parameter set and a corresponding measurement parameter. The second parameter set includes at least one of following parameters: channel measurement information, time information, location information, a cell identity (ID), and scenario information. The measurement parameter includes a channel measurement period and/or a measurement port. The second parameter set is an input of the second model, and the measurement parameter is an output of the second model.

In one embodiment, the third model is configured to determine the cell for the communication/residence of the terminal.

In one embodiment, the cell for the communication/residence of the terminal is determined based on a first indication message.

In one embodiment, the third model is obtained by training according to a historical third parameter set and a corresponding first indication message. The third parameter set includes at least one of following parameters: time, a channel measurement value, location information, a cell ID, and scenario information. The historical parameter set is an input of the third model, and the corresponding first indication message is an output of the third model.

In one embodiment, the model for the mobility management is determined among a plurality of the first models, the second models and the third models.

In one embodiment, the method further includes:

receiving a second indication message, in which the second indication message is configured to instruct the terminal to configure multiple models.

In one embodiment, configuring the multiple models includes:

configuring the multiple models based on acquisition locations of the multiple models included in the second indication message;

or configuring the multiple models based on predefined information.

In one embodiment, the method further includes:

receiving a third indication message, in which the third indication message is configured to instruct the terminal to reconfigure one or more models; and determining to reconfigure one or more models according to the third indication message.

According to a second aspect of embodiments of the present disclosure, a communication method is provided, performed by a network and including:

determining at least one model for mobility management, in which the model for the mobility management includes one or more of a first model, a second model, and a third model; and the mobility management includes one or a combination of: predicting an application scenario, configuring a measurement parameter, and determining a cell for communication/residence.

In one embodiment, the first model is configured to predict the application scenario.

In one embodiment, the first model is obtained by training according to a historical first parameter set and a corresponding application scenario.

The first parameter set includes at least one of following parameters: location information, application usage information, cell selection information, and channel measurement information.

The first parameter set is an input of the first model, and the application scenario is an output of the first model.

In one embodiment, predicting the application scenario includes:

determining a current first parameter set; and determining a current application scenario according to the first parameter set and the first model.

In one embodiment, the second model is configured to configure the measurement parameter, and the measurement parameter is configured for the terminal to perform channel measurement.

In one embodiment, the second model is obtained by training according to a historical second parameter set and a corresponding measurement parameter. The second parameter set includes at least one of following parameters: channel measurement information, time information, location information, a cell identity (ID), and scenario information. The measurement parameter includes a channel measurement period and/or a measurement port. The second parameter set is an input of the second model, and the measurement parameter is an output of the second model.

In one embodiment, configuring the measurement parameter includes:

determining a current second parameter set; and determining the measurement parameter according to the second parameter set and the second model.

In one embodiment, the third model is configured to determine the cell for the communication/residence of the terminal.

In one embodiment, the cell for the communication/residence of the terminal is determined based on a first indication message.

In one embodiment, the third model is obtained by training according to a historical third parameter set and a corresponding first indication message. The third parameter set includes at least one of following parameters: time, a channel measurement value, location information, a cell ID, and scenario information. The historical parameter set is an input of the third model, and the corresponding first indication message is an output of the third model.

In one embodiment, determining the cell for the communication/residence of the terminal includes:

determining a current third parameter set; and determining the cell for the communication/residence of the terminal according to the third parameter set and the third model.

In one embodiment, the model for the mobility management is determined among a plurality of the first models, the second models and the third models.

In one embodiment, the method further includes:

receiving a second indication message, in which the second indication message is configured to instruct the terminal to configure multiple models.

In one embodiment, configuring the multiple models includes:

configuring the multiple models based on acquisition locations of the multiple models included in the second indication message;

or configuring the multiple models based on predefined information.

In one embodiment, the method further includes:

receiving a third indication message, in which the third indication message is configured to instruct the terminal to reconfigure one or more models; and determining to reconfigure one or more models according to the third indication message.

According to a third aspect of embodiments of the present disclosure, a communication device is provided, including:

a processor; and a memory configured to store a processor-executable instruction.

The processor is configured to: execute the communication method according to the first aspect or any one embodiment of the first aspect; or configured to: execute the communication method according to the second aspect or any one embodiment of the second aspect.

According to a fourth aspect of embodiments of the present disclosure, a non-transitory computer-readable storage medium is provided. When an instruction in the storage medium is executed by a processor of a mobile terminal, the mobile terminal is capable of executing the communication method according to the first aspect or any one embodiment of the first aspect; or execute the communication method according to the second aspect or any one embodiment of the second aspect.

In embodiments of the present disclosure, at least one model is determined, in which at least one model includes the first model, the second model and/or the third model. The cell for the communication of the terminal can be determined with the determined at least one model. In the process of determining the cell for the communication, the number of measurements at frequency points, time and ports may be effectively reduced, thus reducing the power consumption of the terminal.

It is further understood that "a plurality" in this disclosure refers to two or more, and other quantifiers are similar thereto. "And/or", which describes an associated relationship of associated objects, means that there may be three relationships, for example, A and/or B, which may mean that A exists alone, A and B exist at the same time, and B exists alone. A character "/" generally indicates that contextual objects are in an "or" relationship. "A/an" and "the" in singular forms are intended to include plural forms, unless clearly indicated in the context otherwise.

It is further understood that terms such as "first", and "second" are used to describe various information, these information should not be limited by these terms. These terms are only used for distinguishing information of the same type from each other and do not denote a particular order or degree of importance. As a matter of fact, the terms such as "first", and "second" may be used interchangeably. For example, first information may also be referred to as second information, and similarly, the second information may also be referred to as the first information, without departing from the scope of embodiments of the present disclosure.

It is further understood that although operations are described in a specific order in the accompanying drawings in the embodiments of the present disclosure, it should not be understood that these operations are required to be performed in the specific order shown or in a serial order, or that all of the operations shown are required to be performed to obtain desired results. In certain circumstances, multitasking and parallel processing may be advantageous.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A communication method, performed by a terminal and comprising:

determining at least one model for mobility management, wherein the model for the mobility management comprises a first model, a second model, and a third model; and the mobility management comprises:

predicting an application scenario, configuring a measurement parameter, and determining a cell for communication/residence;

wherein the first model is configured to predict the application scenario;

the second model is configured to configure the measurement parameter according to a parameter set that is determined according to the application scenario predicted by the first model and a correspondence between the parameter set and the application scenario, and the measurement parameter is configured for the terminal to perform channel measurement;

the measurement parameter comprises at least one of a channel measurement period or a measurement port; and the third model is configured to determine the cell for the communication/residence of the terminal according to a parameter set including a channel measurement value that is measured based on the measurement parameter configured by the second model.

2. The communication method according to claim 1, wherein the first model is obtained by training according to a historical first parameter set and a corresponding application scenario; wherein the first parameter set comprises at least one of following parameters: location information, application usage information, cell selection information, and channel measurement information; and wherein the first parameter set is an input of the first model, and the application scenario is an output of the first model.

3. The communication method according to claim 1, wherein predicting the application scenario comprises:

determining a current first parameter set; and determining a current application scenario according to the first parameter set and the first model.

4. The communication method according to claim 1, wherein the second model is obtained by training according to a historical second parameter set and a corresponding measurement parameter; wherein the second parameter set comprises at least one of following parameters: channel measurement information, time information, location information, a cell identity (ID), and scenario information; and wherein the second parameter set is an input of the second model, and the measurement parameter is an output of the second model.

5. The communication method according to claim 1, wherein the cell for the communication/residence of the terminal is determined based on a first indication message.

6. The communication method according to claim 1, wherein the third model is obtained by training according to a historical third parameter set and a corresponding first indication message; wherein the third parameter set comprises at least one of following parameters: time, a channel measurement value, location information, a cell ID, and scenario information; and wherein the historical parameter set is an input of the third model, and the corresponding first indication message is an output of the third model.

7. The communication method according to claim 1, wherein the model for the mobility management is determined among a plurality of the first models, the second models and third models.

8. The communication method according to claim 7, further comprising:

receiving a second indication message, wherein the second indication message is configured to instruct the terminal to configure multiple models.

9. The communication method according to claim 8, wherein configuring the multiple models comprises:

configuring the multiple models based on acquisition locations of the multiple models comprised in the second indication message;

or configuring the multiple models based on predefined information.

10. The communication method according to claim 8, further comprising:

receiving a third indication message, wherein the third indication message is configured to instruct the terminal to reconfigure one or more models; and determining to reconfigure one or more models according to the third indication message.

11. A communication method, performed by a network and comprising:

determining at least one model for mobility management, wherein the model for the mobility management comprises a first model, a second model, and a third model; and the mobility management comprises:

predicting an application scenario, configuring a measurement parameter, and determining a cell for communication/residence;

wherein the first model is configured to predict the application scenario;

the second model is configured to configure the measurement parameter according to a parameter set that is determined according to the application scenario predicted by the first model and a correspondence between the parameter set and the application scenario, and the measurement parameter is configured for a terminal to perform channel measurement;

the measurement parameter comprises at least one of a channel measurement period or a measurement port; and the third model is configured to determine the cell for the communication/residence of the terminal according to a parameter set including a channel measurement value that is measured based on the measurement parameter configured by the second model.

12. The communication method according to claim 11, wherein the first model is obtained by training according to a historical first parameter set and a corresponding application scenario; wherein the first parameter set comprises at least one of following parameters: location information, application usage information, cell selection information, and channel measurement information; and wherein the first parameter set is an input of the first model, and the application scenario is an output of the first model.

13. The communication method according to claim 11, wherein predicting the application scenario comprises:

determining a current first parameter set; and determining a current application scenario according to the first parameter set and the first model.

14. The communication method according to claim 11, wherein the second model is obtained by training according to a historical second parameter set and a corresponding measurement parameter; wherein the second parameter set comprises at least one of following parameters: channel measurement information, time information, location information, a cell identity (ID), and scenario information;

wherein the second parameter set is an input of the second model, and the measurement parameter is an output of the second model.

15. A communication device, comprising:

a processor;

a memory configured to store a processor-executable instruction;

wherein the processor is configured to:

determine at least one model for mobility management, wherein the model for the mobility management comprises a first model, a second model, and a third model; and the mobility management comprises:

predicting an application scenario, configuring a measurement parameter, and determining a cell for communication/residence;

wherein the first model is configured to predict the application scenario;

the second model is configured to configure the measurement parameter according to a parameter set that is determined according to the application scenario predicted by the first model and a correspondence between the parameter set and the application scenario, and the measurement parameter is configured for the communication device to perform channel measurement;

the measurement parameter comprises at least one of a channel measurement period or a measurement port; and the third model is configured to determine the cell for the communication/residence of the terminal according to a parameter set including a channel measurement value that is measured based on the measurement parameter configured by the second model.

* * * * *